(12) United States Patent
Lopez et al.

(10) Patent No.: US 10,182,449 B2
(45) Date of Patent: Jan. 15, 2019

(54) SCHEDULING NODE, TRANSMITTING NODE, RECEIVING NODE AND METHODS THEREIN, FOR COMMUNICATION OF DATA

(71) Applicant: Telefonaktiebolaget LM Ericsson (publ), Stockholm (SE)

(72) Inventors: Miguel Lopez, Solna (SE); Dennis Hui, Sunnyvale, CA (US); Henrik Sahlin, Mölnlycke (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 442 days.

(21) Appl. No.: 15/146,539

(22) Filed: May 4, 2016

(65) Prior Publication Data

US 2017/0325249 A1 Nov. 9, 2017

(51) Int. Cl.
*H04W 72/12* (2009.01)
*H04L 5/00* (2006.01)
*H04W 72/04* (2009.01)
*H04L 1/08* (2006.01)
(Continued)

(52) U.S. Cl.
CPC ......... *H04W 72/121* (2013.01); *H04L 5/0007* (2013.01); *H04L 5/0037* (2013.01); *H04L 5/0091* (2013.01); *H04W 72/042* (2013.01); *H04W 72/1289* (2013.01);
(Continued)

(58) Field of Classification Search
CPC .................................................. H04W 72/121
See application file for complete search history.

(56) References Cited

U.S. PATENT DOCUMENTS 8,995,568 B1* 3/2015 Wu .................. H04L 25/49
375/260
2009/0016461 A1* 1/2009 Jitsukawa ............... H04B 7/04
375/267
(Continued)

FOREIGN PATENT DOCUMENTS

EP 1950900 A1 7/2008
WO 2012047140 A1 4/2012
WO 2013151476 A2 10/2013

OTHER PUBLICATIONS

International Search Report and Written Opinion for International Patent Application No. PCT/SE2017/050075, dated Apr. 21, 2017, 15 pages.
(Continued)

*Primary Examiner* — Edan Orgad
*Assistant Examiner* — Emmanuel K Maglo
(74) *Attorney, Agent, or Firm* — Withrow & Terranova, PLLC

(57) ABSTRACT

A scheduling node (600), a transmitting node (602), a receiving node (604), and methods therein, for communication of data on a shared radio resource. The scheduling node (600) divides wireless devices into multiple groups, and assigns group-specific rotation angles to the groups so that the transmitting node (602) should apply a group-specific rotation angle when transmitting data to or from a wireless device in the corresponding group. In addition, a repetition factor is assigned to each wireless device such that the data is repeated consecutively according to the repetition factor, before transmission. The repetition factor may correspond to the number of groups.

28 Claims, 9 Drawing Sheets

(51) Int. Cl.
*H04L 27/18* (2006.01)
*H04L 27/34* (2006.01)

(52) U.S. Cl.
CPC ............... *H04L 1/08* (2013.01); *H04L 27/18* (2013.01); *H04L 27/3444* (2013.01)

(56) References Cited

U.S. PATENT DOCUMENTS

| | | | |
|---|---|---|---|
| 2011/0002312 A1* | 1/2011 | Masaoka | H04W 72/005 370/336 |
| 2012/0127935 A1* | 5/2012 | Josiam | H04W 72/121 370/329 |
| 2016/0073387 A1* | 3/2016 | Yang | H04L 5/0048 370/329 |

OTHER PUBLICATIONS

Stacey, Robert, "Specification Framework for TGax," IEEE P802.11 Wireless LANs, IEEE 802.11-15/0132r14, Jan. 21, 2016, pp. 1-43.

* cited by examiner

| Wireless Device | Group | Resource Unit, RU |
|---|---|---|
| 1 | 1 | 1 |
| 2 | 1 | 2 |
| 3 | 1 | 3 |
| 4 | 1 | 4 |
| 5 | 1 | 5 |
| 6 | 1 | 6 |
| 7 | 1 | 7 |
| 8 | 1 | 8 |
| 9 | 2 | 1 |
| 10 | 2 | 2 |
| 11 | 2 | 3 |
| 12 | 2 | 4 |
| 13 | 2 | 5 |
| 14 | 2 | 6 |
| 15 | 2 | 7 |
| 16 | 2 | 8 |

Fig. 7A

| Group | Rotation angle $\theta$ |
|---|---|
| 1 | 0 [rad] |
| 2 | $\frac{2\pi}{64}$ [rad] |

Fig. 7B

Generate symbols:

Repeat & join:

Add CP:

Apply rotation angle:

Received baseband signal:

Remove CP:

Apply de-rotation angle:

Combine slices:

SCHEDULING NODE, TRANSMITTING NODE, RECEIVING NODE AND METHODS THEREIN, FOR COMMUNICATION OF DATA

TECHNICAL FIELD

The present disclosure relates generally to a scheduling node, a transmitting node, a receiving node and methods therein, for communication of data on a shared radio resource.

BACKGROUND

For some years, different types of radio networks for wireless communication have been developed to provide radio access for various wireless devices. The radio networks are constantly improved to provide better coverage and capacity and to meet the demands from subscribers using increasingly advanced services and equipment such as smartphones and tablets, which may require considerable amounts of bandwidth and resources for data transport in the networks. A limiting factor for capacity of a radio network is the amount of available radio resources, e.g. in terms of time, frequency bandwidth and transmit power, and the capacity of a radio network can be improved by more efficient usage of such radio resources.

In this disclosure, the term "wireless device" is used to represent any communication entity, also commonly referred to as a "User Equipment, UE", which is capable of radio communication with a radio network by sending and receiving radio signals. In this context, a wireless device may be, e.g., a mobile telephone, tablet, laptop computer or Machine-to-Machine, M2M, device. Throughout this disclosure, UE could alternatively be used as a synonym for wireless device.

Further, the term "network node", is used herein to represent any node in a wireless network that is operative to communicate radio signals with wireless devices. The network node in this disclosure could also be denoted base station, access point, radio node, e-NodeB, eNB, NB, base transceiver station, etc., depending on the type of network and terminology used.

FIG. 1 illustrates schematically a conventional communication scenario where assignment of available resources is controlled by a scheduling node 100. In this scenario, a network node 102 communicates data with multiple wireless devices 104 simultaneously on a shared radio resource, e.g. a given frequency band, comprising a number of different resource units denoted RU1, RU2, RU3 . . . , such that each wireless device uses its own resource unit. The scheduling node 100 assigns the different resource units to the wireless devices 104 and signals the assignment accordingly.

However, it is a problem that the available radio resource is sometimes not enough to enable communication for a large number of wireless devices being served by the same network node. Another problem is that battery powered wireless devices may consume substantial amounts of energy in their communications such that the battery is quickly drained and must be recharged or replaced. This is particularly a problem for M2M devices that should be able to operate autonomously for extended periods of time, that is without having to recharge or replace their batteries.

Another problem is that wireless devices being located relatively far from the serving network node may need more resources for their communication, which may be solved by transmitting the same data several times so as to increase the probability of correct reception and decoding of the data. When Orthogonal Frequency Division Multiple Access, OFDMA, is used for communication of OFDM symbols, this can be done by repeating each transmitted OFDM symbol at least once. Repetition of data in this manner naturally consumes more resources than transmitting the data only once. A more robust Modulation and Coding Scheme, MCS, may also be used to extend the coverage range. For example, in the 802.11ah standard the MCS called MCS10 is based on repetition of code bits in the transmission.

SUMMARY

It is an object of embodiments described herein to address at least some of the problems and issues outlined above. It is possible to achieve this object and others by using a scheduling node, a transmitting node, a receiving node and methods therein, as defined in the attached independent claims.

According to one aspect, a method is performed by a scheduling node for enabling simultaneous communication of data for multiple wireless devices on a shared radio resource comprising one or more resource units. In this method, the scheduling node divides the wireless devices into multiple groups such that the number of wireless devices in each group does not exceed the number of resource units in the shared radio resource. The scheduling node further assigns at least one resource unit in the shared radio resource to one or more wireless devices in each group such that the at least one resource unit is shared by wireless devices across different groups.

The scheduling node also assigns rotation angles to the one or more wireless devices in the groups indicating that the wireless devices in each group should use a rotation angle that is different from the rotation angle(s) used by the wireless devices in the other group(s). The scheduling node then signals the assignment of the at least one resource unit and rotation angles and a repetition factor, to enable communication of data for the one or more wireless devices in each group using the rotation angle of said group and so that the data is repeated according to the repetition factor.

According to another aspect, a scheduling node is arranged to enable simultaneous communication of data for multiple wireless devices on a shared radio resource comprising one or more resource units. The scheduling node is configured to divide the wireless devices into multiple groups such that the number of wireless devices in each group does not exceed the number of resource units in the shared radio resource. The scheduling node is further configured to assign at least one resource unit in the shared radio resource to one or more wireless devices in each group such that the at least one resource unit is shared by wireless devices across different groups.

The scheduling node is also configured to assign rotation angles to the one or more wireless devices in the groups indicating that the wireless devices in each group should use a rotation angle that is different from the rotation angle(s) used by the wireless devices in the other group(s). The scheduling node is further configured to signal the assignment of the at least one resource unit and rotation angles and a repetition factor, to enable communication of data for the one or more wireless devices in each group using the rotation angle of said group and so that the data is repeated according to the repetition factor.

According to another aspect, a method is performed by a transmitting node for transmitting data to a receiving node on a shared radio resource comprising one or more resource units. In this method the transmitting node obtains, from a scheduling node, an assignment of at least one resource unit in the shared radio resource to multiple wireless devices, and of a rotation angle and a repetition factor.

The transmitting node then creates a time domain signal from the data and repeats the time domain signal according to the repetition factor. The transmitting node further applies the rotation angle to the repeated time domain signal to obtain a baseband signal, and transmits the baseband signal as an up-mixed Radio Frequency, RF, signal on a resource unit in the shared radio resource.

According to another aspect, a transmitting node is arranged to transmit data to a receiving node on a shared radio resource comprising one or more resource units. The transmitting node is configured to obtain, from a scheduling node, an assignment of at least one resource unit in the shared radio resource to multiple wireless devices and of a rotation angle and a repetition factor.

The transmitting node is configured to create a time domain signal from the data, and to repeat the time domain signal according to the repetition factor. The transmitting node is configured to apply the rotation angle to the repeated time domain signal to obtain a baseband signal, and to transmit the baseband signal as an up-mixed Radio Frequency, RF, signal on a resource unit in the shared radio resource.

According to another aspect, a method is performed by a receiving node for receiving data from a transmitting node on a shared radio resource comprising one or more resource units. In this method the receiving node obtains, from a scheduling node, an assignment of at least one resource unit in the shared radio resource to wireless devices in multiple groups and of rotation angles indicating that the wireless devices in each group should use a rotation angle that is different from the rotation angle(s) used by the wireless devices in the other group(s). The receiving node also obtains a repetition factor from the scheduling node.

When receiving a signal on a resource unit in the shared radio resource, the receiving node divides the signal into multiple blocks, each block corresponding to a baseband signal comprising data repeated according to the repetition factor. The receiving node then apples a de-rotation angle to each block such that the de-rotation angle corresponds to one of said rotation angles. The receiving node finally detects desired data based on the de-rotated blocks.

According to another aspect, a receiving node is arranged to receive data from a transmitting node on a shared radio resource comprising one or more resource units. The receiving node is configured to obtain, from a scheduling node, an assignment of at least one resource unit in the shared radio resource to wireless devices in multiple groups and of rotation angles indicating that the wireless devices in each group should use a rotation angle that is different from the rotation angle(s) used by the wireless devices in the other group(s), and a repetition factor.

The receiving node is further configured to receive a signal on a resource unit in the shared radio resource, and to divide the signal into multiple blocks, each block corresponding to a baseband signal comprising data repeated according to the repetition factor. The receiving node is also configured to apply a de-rotation angle to each block such that the de-rotation angle corresponds to one of said rotation angles, and to detect desired data based on the de-rotated blocks.

The above methods and nodes may be configured and implemented according to different optional embodiments to accomplish further features and benefits, to be described below.

A computer program is also provided comprising instructions which, when executed on at least one processor in either of the scheduling node, the transmitting and the receiving node, cause the at least one processor to carry out either of the methods described above for the scheduling node, the transmitting and the receiving node, respectively. A carrier is also provided which contains the above computer program, wherein the carrier is one of an electronic signal, optical signal, radio signal, or a computer readable storage medium.

BRIEF DESCRIPTION OF DRAWINGS

The solution will now be described in more detail by means of exemplary embodiments and with reference to the accompanying drawings, in which:

FIGS. 7A and 7B are tables illustrating an assignment example where the solution may be employed, according to further possible embodiments.

DETAILED DESCRIPTION

Briefly described, a solution is provided to increase capacity in communication between a network node and multiple wireless devices when using a given shared radio resource, by allowing a greater number of wireless devices to transmit at the same time as compared to conventional procedures. This is achieved by dividing the wireless devices into multiple groups, e.g. two groups, and assigning different group-specific rotation angles to the wireless devices in the different groups so that the devices in each group should apply its assigned rotation angle when transmitting data. In addition, a repetition factor is assigned to each wireless device such that the data is repeated consecutively according to the repetition factor, before transmission.

This way, the repeated data can be transmitted on the same resource unit, e.g. the same time and frequency, from devices in different groups without interfering with each other by applying the different rotation angles. The repetition is applied to increase the robustness of the transmission which thus enables enhanced coverage. When a signal is repeated it effectively occupies a narrower bandwidth than it did prior to repetition. Several signals having the same bandwidth are initially assigned the same center of frequency. After repetition is applied, the signals occupy only a fraction of the original bandwidth, but overlap in the frequency domain. By applying judiciously chosen rotation angles to each signal, their centers of frequency are translated and orthogonality is achieved in the frequency domain.

In other words, the group-specific rotation angles make the transmissions orthogonal to one another and each wireless device within one group applies rotation on the transmitted data using the rotation angle assigned to that group. In addition, a repetition factor is also employed such that the data is repeated consecutively according to the repetition factor. The repetition factor may correspond to the number of groups, and if there are e.g. two groups using two different group-specific rotation angles, each piece of data such as an OFDM symbol can be transmitted two times, i.e. the same data is repeated once in the transmission. Basically, by repeating the data in the transmission, the coverage range can be extended and/or the likelihood of correct reception and decoding of the data is increased.

Figure 2:
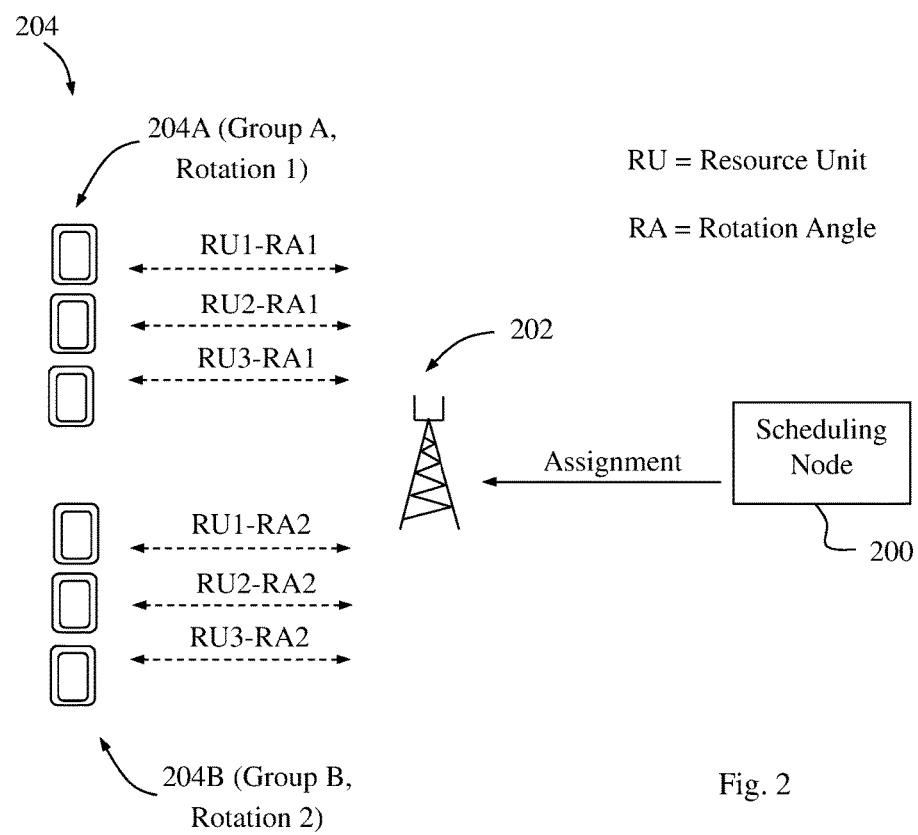
FIG. 2 is a communication scenario illustrating an example of how the solution may be employed for communication involving multiple wireless devices, according to some possible embodiments.

FIG. 2 illustrates schematically an example communication scenario where the above solution is employed, involving a scheduling node 200, a network node 202 and multiple wireless devices 204. It is assumed that a certain number of resource units are available in a shared radio resource, and that the resource units are orthogonal to one another by being separated in frequency domain. In this example, the scheduling node 200 divides the wireless devices 204 into two groups A and B such that three wireless devices 204A belong to group A and three other wireless devices 204B belong to group B. This is done so that the number of wireless devices in each group does not exceed the number of available resource units in the shared radio resource.

The scheduling node 200 also assigns resource units in a shared radio resource to the wireless devices in each group such that each resource unit is shared by two wireless devices, one device in each group A, B. In more detail, a first resource unit RU1 is assigned to a first wireless device in each group, a second resource unit RU2 is assigned to a second wireless device in each group, and a third resource unit RU3 is assigned to a third wireless device in each group.

The scheduling node 200 further assigns different group-specific rotation angles to the wireless devices 204A and 204B in the different groups. The group-specific rotation angles are denoted RA1 for group A and RA2 for group B, respectively. The scheduling node 200 also assigns a repetition factor of 2 to all the wireless devices 204A and 204B which effectively instructs them to repeat the data according to the repetition factor. The repetition factor of 2 corresponds to the number of groups, namely group A and group B. As a result, all wireless devices in groups A and B will repeat their respective data such that the same data is included twice in the transmission. Then the first wireless device in group A will apply the rotation angle RA1 when transmitting its repeated data on the first resource unit RU1 and the first wireless device in group B will apply the rotation angle RA2 when transmitting its repeated data on the same resource unit RU1. Since the different rotation angles RA1 and RA2 and said repetition make the transmissions orthogonal in a manner to be explained below, they will not interfere with one another even though the same resource unit RU1 is used.

In the same manner, the second and third wireless devices in group A will apply the rotation angle RA1 when transmitting their repeated data on the second and third resource units RU2 and RU3, respectively, while the second and third wireless devices in group B will apply the rotation angle RA2 when transmitting their repeated data on the same resource units RU2 and RU3, respectively.

It will now be described how rotation can be applied by a specific rotation angle to a transmission, with reference to the diagrams in FIGS. 2A-C which basically illustrate the magnitude of different transmitted samples.

Figure 2A:
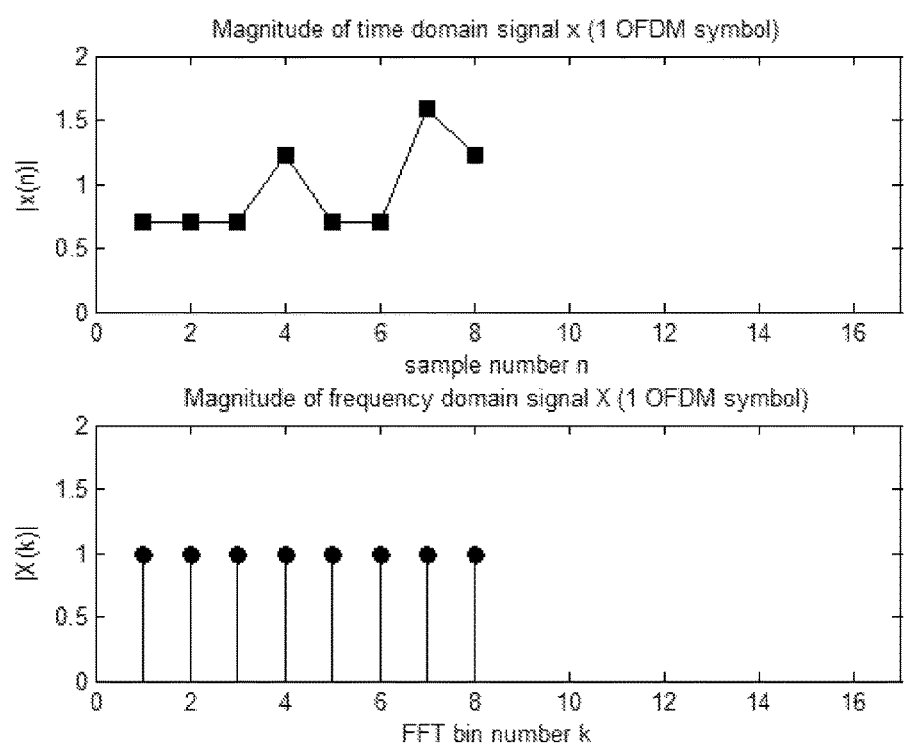
FIGS. 2A-C illustrate the magnitude of different transmitted signals, according to further possible embodiments.

FIG. 2A illustrates a signal comprised of one OFDM symbol. Both time and frequency domain representations are shown in the top and bottom diagrams, respectively.

Figure 1:
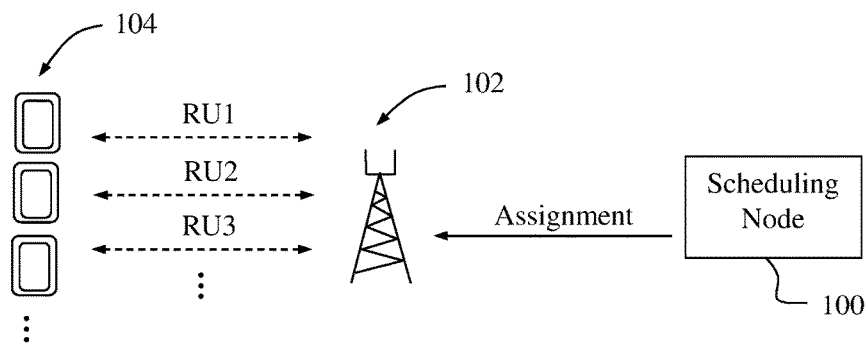
FIG. 1 is a communication scenario illustrating how different radio resources can be used for different wireless devices, according to the prior art.
Figure 2B:
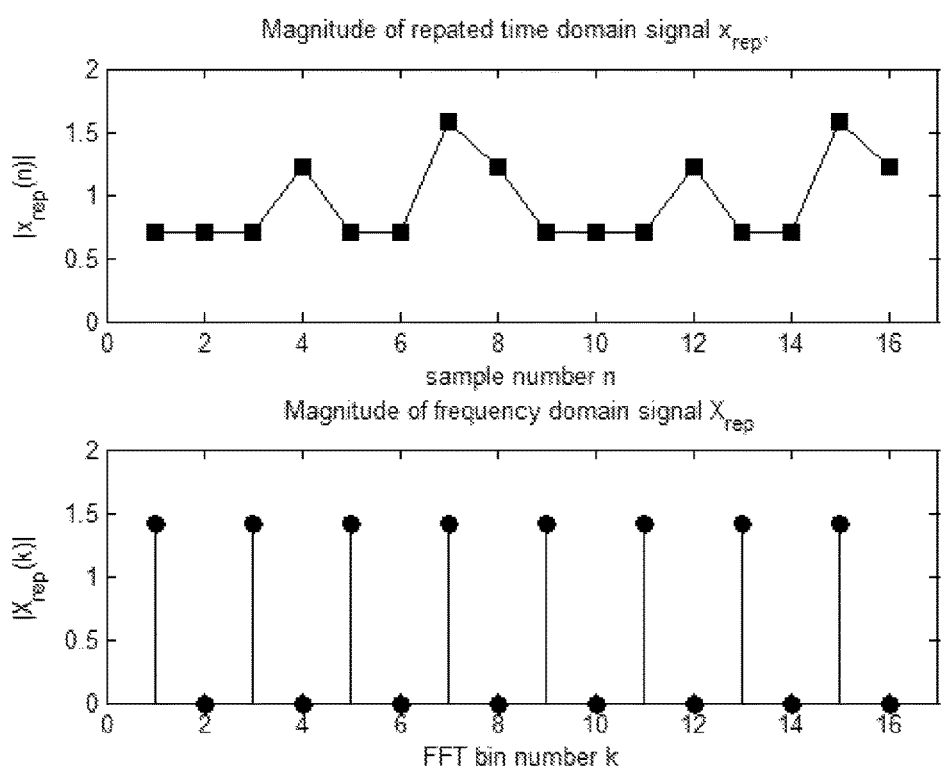

FIG. 2B illustrates a signal including 2 times, i.e. one repetition, of the time domain signal of FIG. 1A. The frequency domain representation in the bottom diagram, consisting of a Fast Fourier Transform, FFT, of the time domain signal in the top diagram, shows that the repeated signal occupies only half of the bandwidth, since the power in the even numbered FFT bins 2, 4, 6 . . . is zero.

Figure 2C:
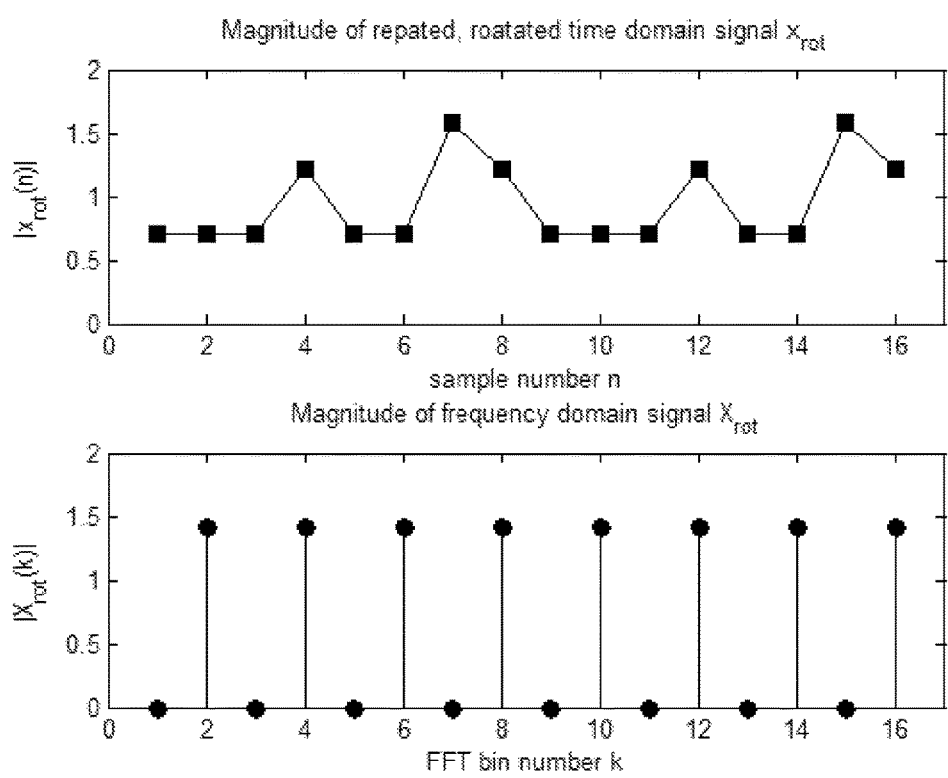

FIG. 2C illustrates a signal obtained by applying a rotation to the time domain signal shown in FIG. 2B. The rotation angle is $2\pi/16$, where 16 is the number of samples in the signal. The rotation changes the phase of the time domain signal, not seen in FIG. 2C since only the magnitude is plotted, and translates the frequency domain signal. It can be seen that the repeated, rotated signal has zero power in the odd-numbered FFT bins 1, 3, 5 . . . . By comparing the frequency domain signals in FIG. 2B and FIG. 2C, it can be seen that two signals of different rotations are orthogonal in the frequency domain since the signal power of each signal is concentrated in the FFT bins where the other signal has zero power.

An example of how the solution may be employed in terms of functionality in a scheduling node, will now be described with reference to the flow chart in FIG. 3 which illustrates a procedure with actions performed by the scheduling node for enabling simultaneous communication of data for multiple wireless devices on a shared radio resource comprising one or more resource units. The scheduling node in this procedure corresponds to the scheduling node 200 of FIG. 2.

An initial action 300 illustrates that the scheduling node divides the wireless devices into multiple groups such that the number of wireless devices in each group does not exceed the number of resource units in the shared radio resource. For example, if there are 6 devices currently being served by the same network node and there are 3 available resource units in the shared radio resource, it is possible to divide the devices into 2 groups, with 3 devices in each group, just like the example of FIG. 2. In another example, if there are 12 devices served by the same network node and 4 available resource units in the shared radio resource, it is necessary to divide the devices into 3 groups, with 4 devices in each group.

In a next action 302, the scheduling node assigns at least one resource unit in the shared radio resource to one or more wireless devices in each group such that the at least one resource unit is shared by wireless devices across different groups. For example, it was illustrated in FIG. 2 that resource unit RU1 is assigned to two devices, i.e. the first wireless device in both groups A and B, and so forth.

In a further action 304, the scheduling node assigns rotation angles to the one or more wireless devices in the groups indicating that the wireless devices in each group should use a rotation angle that is different from the rotation angle(s) used by the wireless devices in the other group(s). For example, it was illustrated in FIG. 2 that rotation angle RA1 is assigned to the wireless devices in group A, and rotation angle RA2 is assigned to the wireless devices in group B. It should be noted that actions 302 and 304 may be executed in any order, i.e. 302 before 304 or 304 before 302.

A final action 306 illustrates that the scheduling node signals the assignment of the at least one resource unit and rotation angles and a repetition factor, to enable communication of data for the one or more wireless devices in each group using the rotation angle of said group and so that the data is repeated according to the repetition factor.

In an example embodiment, the repetition factor may correspond to the number of groups so that the same data is transmitted a number of times being the same number as the number of groups. In the example of two groups as of FIG. 2, the same data is transmitted twice. In general, when there are N groups the same data is transmitted N times according to this embodiment. The signalled repetition factor may be configured in a predefined relation to the number of groups and the number of transmissions required for the same data. In the above general case, the repetition factor may be equal to N to indicate the number of transmissions, or N−1 to indicate the number of added repetitions, or any other predefined relation to the number of groups or transmissions.

Figure 3:
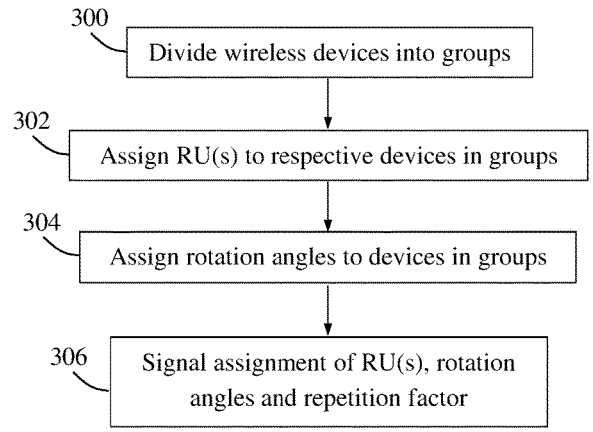
FIG. 3 is a flow chart illustrating a procedure in a scheduling node, according to further possible embodiments.

In the procedure of FIG. 3, it is possible to employ various further embodiments as follows. In one example embodiment, the shared radio resource may comprise multiple orthogonal resource units which are separated in frequency domain, which has also been mentioned above. In another example embodiment, the repetition factor may be selected depending on requirements for at least one of receiver sensitivity and transmission range required to reach at least some of the wireless devices. In this embodiment, it is assumed that the transmission range increases with increased number of transmissions of the same data, provided that the same transmission power is used, since repetition of the same data increases the likelihood of correct reception and decoding of the data. Thereby, wireless devices located farther away from the network node can get their transmitted data received properly by the network node as compared to repeating the data less times or not at all.

In further example embodiments, if OFDMA is used in the communication of OFDM symbols, the signalled assignment may indicate that each OFDM symbol should be transmitted a number of times as a set of equal OFDM symbols according to the repetition factor, and that the set of equal OFDM symbols should be rotated according to the rotation angle of the respective group. An example where this embodiment is used will be described later below with reference to FIGS. 8A and 8B.

In another example embodiment, the signalled assignment may further indicate that only one cyclic prefix should be appended prior to the whole set of equal OFDM symbols. Normally, a cyclic prefix is appended prior to each transmitted OFDM symbol. The cyclic prefix acts as a buffer region or guard interval to protect OFDM signals from intersymbol interference. The cyclic prefix is created so that each OFDM symbol is preceded by a copy of the end part of that same OFDM symbol. Use of the cyclic prefix facilitates correct and reliable reception of the OFDM signal. In this embodiment, energy for transmitting the information is saved by appending only one cyclic prefix to a complete set of multiple equal OFDM symbols.

An example of how the solution may be employed in terms of functionality in a transmitting node, will now be described with reference to the flow chart in FIG. 4 which illustrates a procedure with actions performed by the transmitting node for transmitting data to a receiving node on a shared radio resource comprising one or more resource units. The transmitting node in this procedure may correspond to either of the wireless devices 204 of FIG. 2.

An initial action 400 illustrates that the transmitting node obtains, from a scheduling node, an assignment of at least one resource unit in the shared radio resource to multiple wireless devices and of a rotation angle. In this action, the transmitting node also obtains a repetition factor from the scheduling node. The above assignment and repetition factor may be obtained when signaled by the scheduling node which information may be broadcasted by a network node serving the wireless devices. The scheduling node in this action may be the scheduling node that performs the procedure described above for FIG. 3.

In a next action 402, the transmitting node creates a time domain signal from the data. In another action 404, the transmitting node repeats the time domain signal according to the repetition factor. For example, if the obtained repetition factor is 2, the transmitting node repeats the time domain signal once so that it will be transmitted two times. Alternatively, a repetition factor of 1 may indicate that the time domain signal is repeated once so that it will be transmitted totally two times.

In a next action 406, the transmitting node applies the rotation angle in the obtained assignment to the repeated time domain signal to obtain a baseband signal. A final action 408 illustrates that the transmitting node transmits the baseband signal as an up-mixed, i.e. up-converted, Radio Frequency, RF, signal on a resource unit in the shared radio resource. Thereby, a receiving node that receives the baseband signal transmitted in action 408 is able to detect which group the transmitting node belongs to basically by applying a de-rotation angle that corresponds to the rotation angle used by the transmitting node, and thereby also to identify the transmitting node based on the group and the resource unit used for the transmission. Basically, the de-rotation angle indicates the group. In a given resource unit, after de-rotation by the angle corresponding to the group and combination of consecutive slices of a de-rotated block, all the signals except the wanted signal belonging to this group will be cancelled out at the receiving node. A more detailed example of how actions 402-408 may be executed in practice will be described later below.

Figure 4:
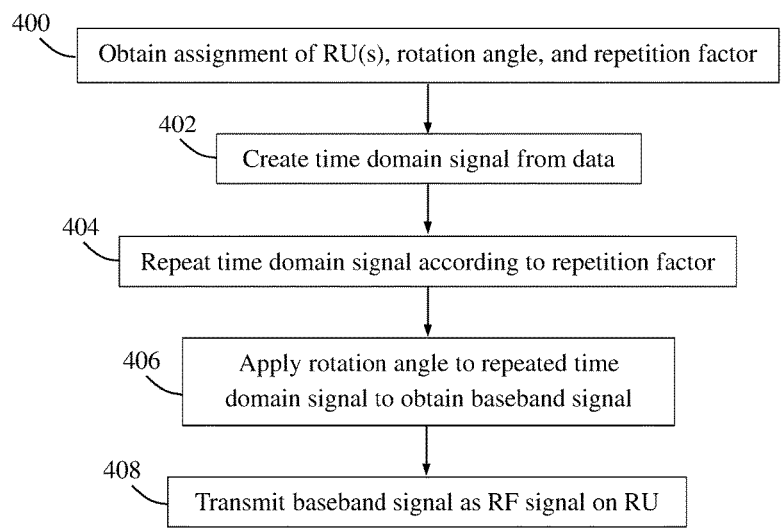
FIG. 4 is a flow chart illustrating a procedure in a transmitting node, according to further possible embodiments.

In the procedure of FIG. 4, it is possible to employ various embodiments as follows. In one example embodiment, if OFDMA is used in the communication of OFDM symbols, each OFDM symbol may be transmitted with said data a number of times as a set of equal OFDM symbols according to the repetition factor, and in this case the set of equal OFDM symbols is rotated according to the rotation angle. In that case, another example embodiment is that a cyclic prefix is appended prior to the whole set of equal OFDM symbols. Thereby, energy and information space are saved by appending only one cyclic prefix to the multiple equal OFDM symbols instead of appending one cyclic prefix prior to each OFDM symbol in the set.

An example of how the solution may be employed in terms of functionality in a receiving node, will now be described with reference to the flow chart in FIG. 5 which illustrates a procedure with actions performed by the receiving node for receiving data from a transmitting node on a shared radio resource comprising one or more resource units. The transmitting node in this procedure may correspond to either of the wireless devices 204 of FIG. 2, and may further be the transmitting node that performs the procedure described above for FIG. 4.

An initial action 500 illustrates that the receiving node obtains, from a scheduling node, an assignment of at least one resource unit in the shared radio resource to wireless devices in multiple groups and of rotation angles indicating that the wireless devices in each group should use a rotation angle that is different from the rotation angle(s) used by the wireless devices in the other group(s), and a repetition factor. The scheduling node in this action may be the scheduling node that performs the procedure of FIG. 3.

In a next action 502, the receiving node receives a signal on a resource unit in the shared radio resource. In a next action 504, the receiving node divides the signal into multiple blocks, each block corresponding to a baseband signal comprising data which data is repeated according to the repetition factor. In a following action 506, the receiving node further applies a de-rotation angle to each block such that the de-rotation angle corresponds to one of said rotation angles. A more detailed example of how actions 502-506 may be executed in practice will be described later below.

A final action 508 illustrates that the receiving node detects desired data based on the de-rotated blocks. The term "desired data" is used here to indicate that this data has been transmitted by the transmitting node which is a wireless device that belongs to the group that has been assigned to use the rotation angle to which the above applied de-rotation angle corresponds. As mentioned above for FIG. 4, it can be detected from the signal transmitted in action 408, which is received in action 502, which group each transmitting node belongs to, by applying a de-rotation angle that corresponds to the rotation angle used by the transmitting node.

Thereby, it is also possible to identify each transmitting node based on the detected group and the resource unit on which the signal was received. As mentioned above, the assignment obtained in action 500 basically indicates that each resource unit in the shared radio resource is assigned to one wireless device in each group such that the correct wireless device can be identified by applying the correct de-rotation angle that corresponds to the rotation angle assigned to that wireless device's group.

Figure 5:
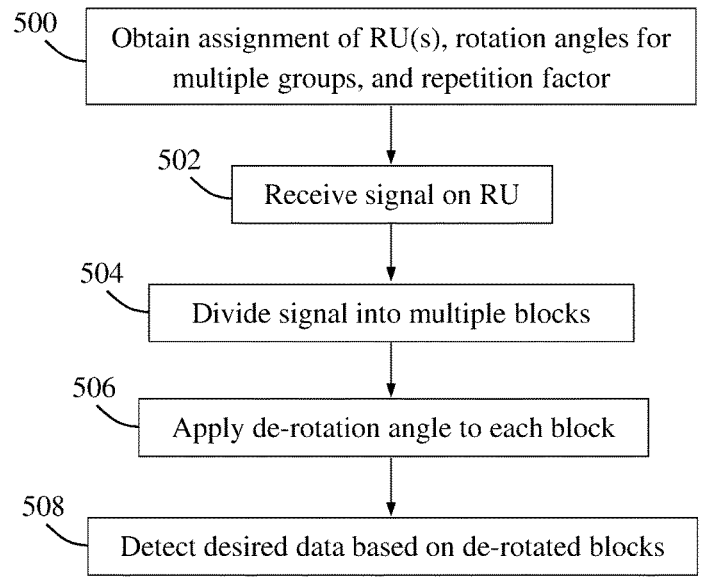
FIG. 5 is a flow chart illustrating a procedure in a receiving node, according to further possible embodiments.

In the procedure of FIG. 5, it is possible to employ various embodiments as follows. In one example embodiment, each de-rotated block may be split into a number of consecutive slices corresponding to the repetition factor, and each block may then be detected by combining the consecutive slices.

In another example embodiment, the repetition factor may correspond to the number of groups, e.g. as described above for FIG. 3. In another example embodiment, the receiving node may be a network node serving at least one wireless device in each group, and in this case data from said wireless devices may be detected by applying de-rotation angles to each block corresponding to respective rotation angles of each group.

In another example embodiment, the received signal may comprise multiple baseband signals, each baseband signal being received on the resource unit from a wireless device in a respective group, and in this case a de-rotation angle corresponding to the rotation angle of said group may be applied to each block.

Figure 6:
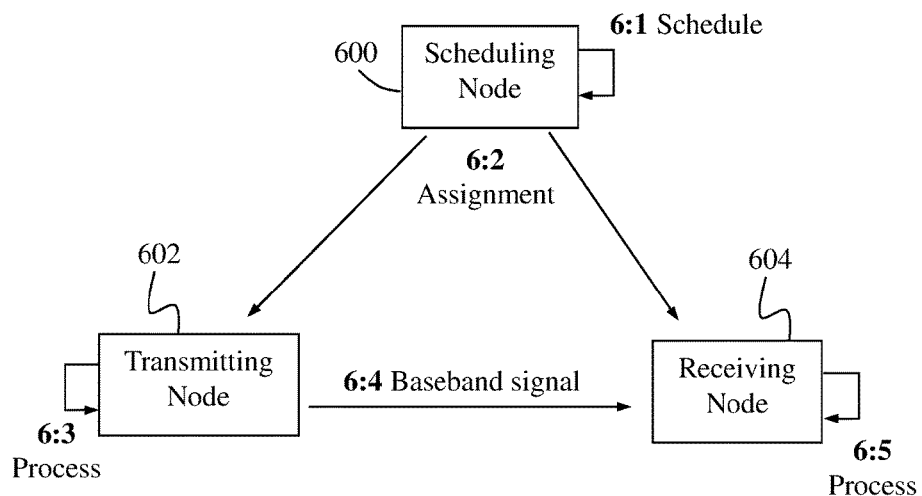
FIG. 6 is a communication scenario involving a scheduling node, a transmitting node and a receiving node, according to further possible embodiments.

It was described above how a scheduling node, a transmitting node and a receiving node may operate according to the actions in the flow charts in FIGS. 3, 4 and 5, respectively. FIG. 6 illustrates a communication scenario where a scheduling node 600 may operate according to FIG. 3, a transmitting node 602 may operate according to FIG. 4, and a receiving node 604 may operate according to FIG. 5.

In the figure, an action 6:1 illustrates that the scheduling node 600 performs scheduling and assignment of resource units and rotation angles basically in accordance with actions 300-304. An action 6:2 illustrates that the scheduling node 600 signals the assignment basically in accordance with action 306.

A further action 6:3 illustrates that the transmitting node 602 performs various processing in preparation for transmission of data, basically in accordance with actions 400-406. An action 6:4 illustrates that the transmitting node 602 transmits a baseband signal basically in accordance with action 408. The transmitted baseband signal is received by the receiving node 604. A further action 6:5 illustrates that the receiving node 604 performs various processing of a received signal, basically in accordance with actions 502-508, in order to detect received data.

Even though the solution described herein is exemplified by means of an OFDMA system, it can generally be applied in other multicarrier systems such as SC-FDMA used in LTE for Uplink, UL, transmission, or Filter Bank Multicarrier, FBMC, proposed for 5G wireless systems.

Specifically, it is assumed that a system using a standard similar to the standard called 802.11ax, with 20 MHz total system bandwidth, employs OFDMA in the UL. A non-limiting example of how a scheduling node may operate in practice, will now be described in more detail. In the following description, the wireless devices will sometimes be alternatively referred to as "users" for short.

In this case the scheduling node is an Access Point, AP. In the above standard 802.11ax, the 20 MHz bandwidth is divided into 9 sub-bands of 2.03 MHz, each composed of 26 sub-carriers. Moreover, some sub-carriers are left empty as guard bands among the sub-bands. In order to simplify the explanation, in the example below it is assumed that the bandwidth is divided into 8 sub-bands. This will simplify the numerology, yet illustrating how the solution could be applied in a wireless network where 802.11ax is used.

The shared radio resource in this example is a frequency band which is divided into resource units separated in frequency domain, including 8 non-overlapping sub-bands of 2.5 MHz, labeled sub-band 1 to sub-band 8, which is illustrated by the table in FIG. 7A. The AP has an Fast Fourier Transform, FFT, size of 256, while the wireless devices have an FFT size of 32. Thus, the subcarrier spacing is 20 MHz/256=2.5 MHz/32=78.125 kHz. Employing OFDMA, the AP can schedule up to 8 simultaneous wireless devices for UL transmission. It is assumed for ease of explanation, and without limitation, that after channel coding and modulation but before repetition, the data can be transmitted in one OFDM symbol. It is also assumed that neither the AP nor the wireless devices support other FFT sizes.

Further, it is assumed that there are 16 wireless devices, labeled 1-16, that require UL transmission and which also need a power boost in order to extend their coverage by 3 dB. Using traditional OFDMA, only 8 wireless devices can be scheduled simultaneously. However, according to the solution described herein, the AP is able to schedule the 16 wireless devices simultaneously, as will be explained below.

The AP divides the wireless devices into M=2 groups of 8 wireless devices in each group. For example the wireless devices numbered 1 to 8 are assigned to the first group and the wireless devices numbered 9 to 16 are assigned to the second group, as indicated in FIG. 7A. Further, each wireless device within one group is assigned a different Resource Unit, RU. The table in FIG. 7A exemplifies such an assignment of RUs.

This resource assignment resembles a non-orthogonal channel assignment, since each RU is shared by two wireless devices. The frequency domain symbols, e.g. according to Quadrature Amplitude Modulation, QAM or Phase Shift Keying, PSK, may be denoted $\{X_i(k): k=0, \ldots, 31\}$ carrying the data for i-th user, $i=1, \ldots, 16$. However, the solution allows for sub-channels that can easily be separated at the receiving node.

The AP further assigns a group specific rotation angle $\theta_i$ to each group, according to the table of FIG. 7B. The scheduling node then sends the assignment in an UL scheduling grant to the wireless devices 1 to 16, for example in an 802.11ax trigger frame. This grant contains the information in FIGS. 7A and 7B. The grant also contains, implicitly or explicitly, a transmission time indicating the start of the packet transmissions. In the case of 802.11ax, the transmission time is signaled implicitly by the reception trigger frame itself.

A non-limiting example of how a transmitting node may operate in practice, will now also be described in more detail. In this case the transmitting node is a wireless device among the wireless devices 1-16 in FIG. 7A.

First, each wireless device i constructs its time domain signal $x_i(n)$ as is usually done in OFDM. That is, $$x_i(n) = \sqrt{32} \sum_{k=0}^{31} X_i(k) \exp\left(j2\pi \frac{k \cdot n}{32}\right),$$

$$n = 0, \ldots, 31; i = 1, \ldots, 16.$$

It was mentioned above that the sampling rate is 2.5 MHz.

Second, each wireless device i repeats its time domain signal to obtain a waveform $\bar{x}_i(n)$ that is twice as long as the original. The total number of copies of the original signal is M=2.

$$\bar{x}_i(n) = \begin{cases} x_i(n), & \text{for } n = 0, \ldots, 31 \\ x_i(n-32), & \text{for } n = 32, \ldots, 63 \end{cases}.$$

Third, each wireless device i inserts only one cyclic prefix, CP. In this example the CP has length of 3 samples. In general only one CP is inserted for each sequence of repetitions. After CP insertion a signal $\{\bar{x}_i^{CP}(n): n=-3, \ldots, 63\}$ is obtained. It should be noted that negative sample indices are used herein to indicate the samples corresponding to the CP.

$$\bar{x}_i^{CP}(n) = \begin{cases} \bar{x}_i(n), & \text{for } n = 0, \ldots, 63 \\ \bar{x}_i(63+n+1), & \text{for } n = -3, -2, -1 \end{cases}.$$

Fourth, each wireless device i applies the user specific rotation $\theta_i$ to its time domain signal, to obtain the baseband signal $\{t_i(n): n=-3, \ldots, 63\}$. According to FIG. 7B, $\theta_i=0$ for $i=1, \ldots, 8$ and $\theta_i=2\pi/64$ for $i=9, \ldots, 16$, so that $$t_i(n) = \bar{x}_i^{CP}(n) \cdot e^{jn \cdot \theta_i}, n = -3, \ldots, 63.$$

Finally, the signals are $t_i(n)$ up-mixed, amplified and the resulting RF signal is transmitted in the respective resource unit of the allotted frequency band.

Figure 8A:
FIG. 8A illustrates an example of processing in a transmitting node, according to further possible embodiments.
Figure 8A:
Figure 8A:
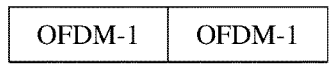
Figure 8A:
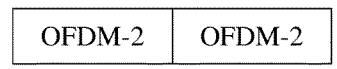
Figure 8A:
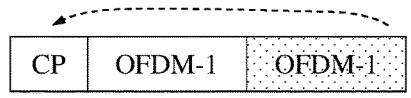
Figure 8A:
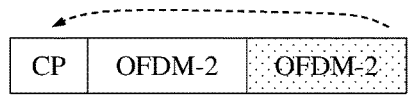
Figure 8A:
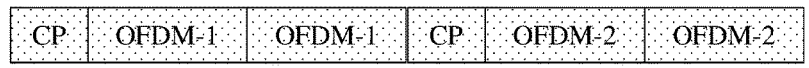
Figure 8B:
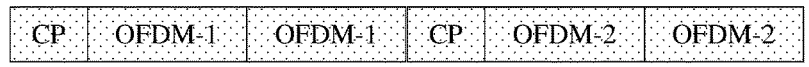
FIG. 8B illustrates an example of processing in a receiving node, according to further possible embodiments.
Figure 8B:
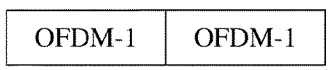
Figure 8B:
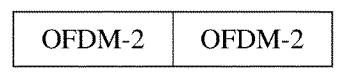
Figure 8B:
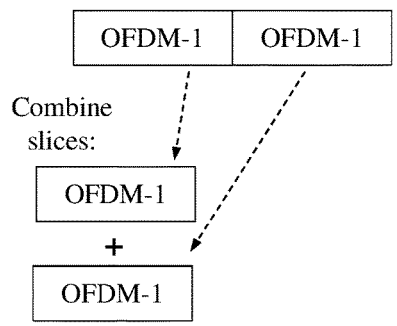
Figure 8B:
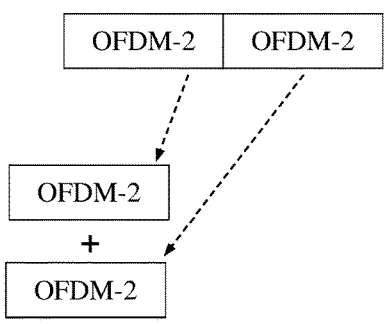

The packet generation procedure is illustrated in FIG. 8A.

A non-limiting example of how a receiving node may operate in practice, will now further be described in more detail. In this case the receiving node is a base station or an access point.

The noisy received baseband signal is denoted as: y(n), $n=-24=3\cdot 8, \ldots, 511=64\cdot 8-1$.

It is assumed that the analog signal has been sampled at a rate of 20 MHz.

First, frame synchronization is performed. After frame synchronization the receiving node has determined that the desired signals start at the index n=0.

Second, CP removal is performed. The received signal is simply: y(n), $n=0, \ldots, 511$.

Third, the signal is de-rotated. There are two possible rotation angles, so two new signals are obtained, namely $z_m(n)$, $n=0, \ldots, 511$; $m=1, 2$. Since the sampling rates at transmission and reception differ by a factor 8, the de-rotation angles $\alpha_m$, $m=1, 2$ are calculated as follows:

$$\alpha_1 = 0,$$

$$\alpha_2 = -\frac{2\pi}{64 \cdot 8} = -\frac{2\pi}{512}.$$

In other words, the de-rotation angles are determined as the negative of the rotation angles divided by 8. The de-rotated signals are thus:

$$z_0(n) = y(n) \cdot e^{-jn \cdot \alpha_1} = y(n), n = 0, \ldots, 511,$$

$$z_1(n) = y(n) \cdot e^{-jn \cdot \alpha_2} = y(n) \cdot e^{-jn \cdot \frac{2\pi}{512}}, n = 0, \ldots, 511.$$

Fourth, the de-rotated signals are split into two halves in time and combined, to obtain the signals $u_m(n)$, $n=0, \ldots, 255$; $m=1, 2$. This operation is performed as follows:

$$u_m(n) = \frac{z_m(n) + z_m(n+256)}{2}, n = 0, \ldots, 255; m = 1, 2.$$

The combination step achieves two goals. The first goal is to increase the Signal to Noise Ratio, SNR by 3 dB, since the repetitions are coherently combined. The second goal is to eliminate the signals from one of the groups. The samples $u_1(n)$ contain only energy from the wireless devices 1 to 8 in group 1, while the energy corresponding to wireless devices 9 to 16 has been eliminated. Similarly, the samples $u_2(n)$ contain only energy from the wireless devices 9 to 16 in group 2, while the energy corresponding to wireless devices 1 to 8 has been eliminated. Thus, orthogonality has been restored.

Fifth, the frequency domain samples are computed.

$$U_1(k) = \frac{1}{\sqrt{256}} \sum_{n=0}^{255} u_1(k) \exp\left(j2\pi \frac{k \cdot n}{256}\right), k = 0, \ldots, 255,$$

$$U_2(k) = \frac{1}{\sqrt{256}} \sum_{n=0}^{255} u_2(k) \exp\left(j2\pi \frac{k \cdot n}{256}\right), k = 0, \ldots, 255.$$

This completes separation of the wireless devices. This procedure is illustrated in FIG. 8.

In another non-limiting example, the above-described scheduling node may basically operate as follows:

- The scheduling node chooses a positive integer M depending on the required RX sensitivity and/or transmission range.
- A scheduling node selects one more users, which are scheduled for a simultaneous, frame synchronized, transmission.
- The scheduling node divides the selected users into M groups, each group consisting of at most K users.
- The scheduling node allocates orthogonal radio resources to each of the groups. For example in OFDMA systems this means non overlapping frequency subbands.
- The scheduling node allocates a user-specific rotation angle to each user. The scheduling node sends a scheduling grant to the users, indicating to each user, implicitly or explicitly, the radio resource allocation, the repetition factor M and the rotation angle.
- The scheduling node signals the radio resource allocations, repetition factor M, groups, and the group-specific rotations to the transmitting nodes.

In another non-limiting example, the above-described transmitting node, such as each wireless device 1-16, may basically operate as follows:

- The transmitting nodes generate the multicarrier symbols corresponding to its payload
- The transmitting nodes repeat each multicarrier symbol M times.
- The repeated copies of each symbol are placed consecutively in time, and one cyclic prefix is appended to each group of M symbols.
- A group specific rotation is applied to the repeated multicarrier symbols generated as above.
- The transmitting nodes transmit their respective signals simultaneously.

In another non-limiting example, the above-described receiving node may basically operate as follows:

- After frame synchronization and CP removal, the received signal is divided into blocks, each block containing M multicarrier symbols.
- The receiving node applies M different de-rotation angles to each of the blocks obtained as above, thus creating at least M virtual received signals.
- The receiving node splits each of de-rotated blocks into M consecutive slices.
- The receiving node combines groups of M consecutive slices to obtain combined virtual multicarrier symbols
- The receiving node separates the multiple users by transforming the combined virtual multicarrier symbols to a transformed domain, such as the frequency domain.
- The receiving node demodulates and decodes data from each user separately.

Figure 9:
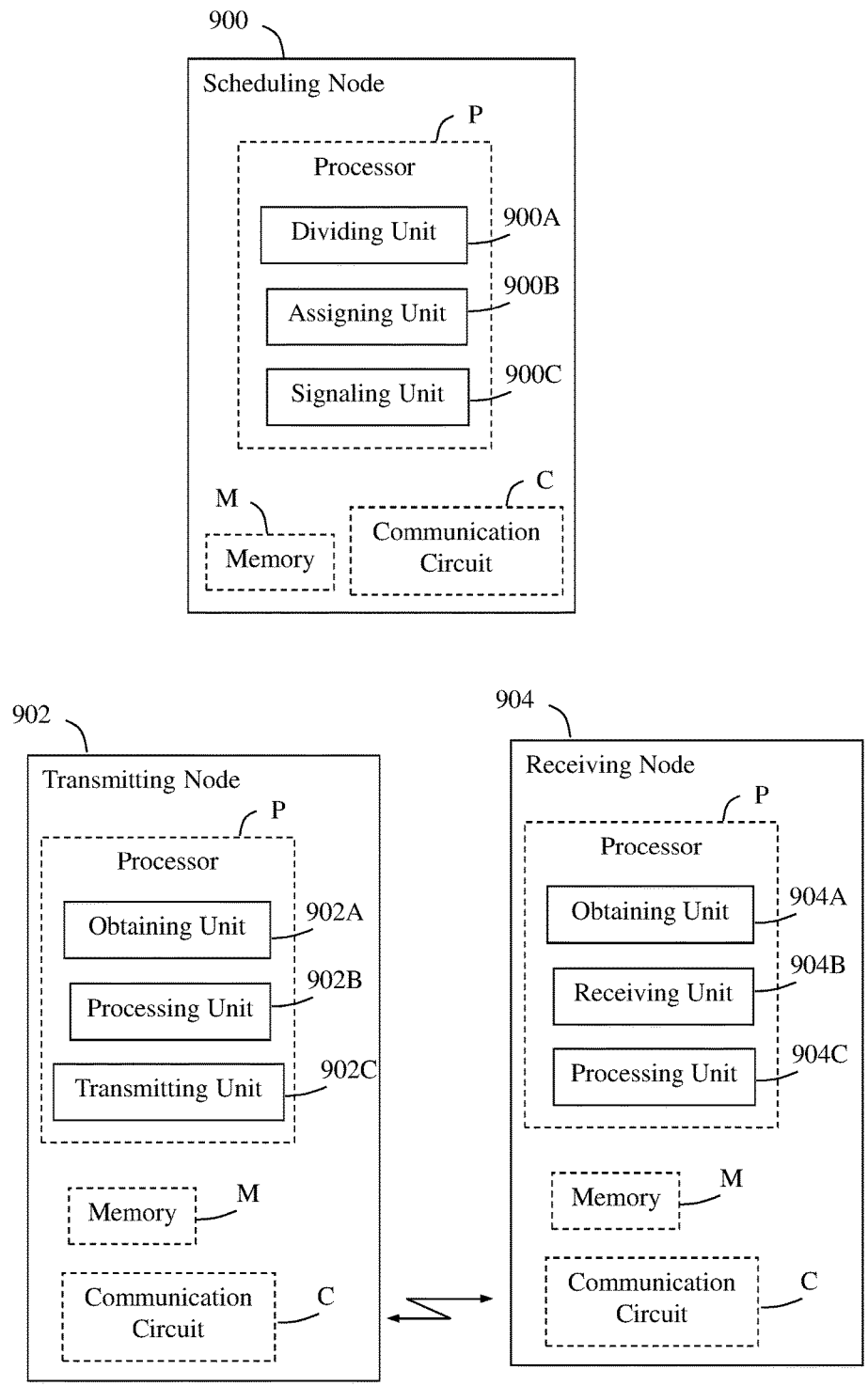
FIG. 9 is a block diagram illustrating a scheduling node, a transmitting node and a receiving node in more detail, according to further possible embodiments.

It was mentioned above that the procedures illustrated in FIGS. 3, 4 and 5, and the above-described embodiments thereof, are performed by a scheduling node, a transmitting node and a receiving node, respectively. The block diagram in FIG. 9 illustrates a detailed but non-limiting example of how a scheduling node 900, a transmitting node 902 and a receiving node 904 may be structured to bring about the above-described solution and embodiments thereof.

The scheduling node 900 may thus be configured to operate according to any of the above-described examples and embodiments described for FIG. 3. The scheduling node 900 is shown to comprise a processor P and a memory M, the memory M comprising instructions executable by said processor P whereby the scheduling node 900 is operative as described herein. The scheduling node 900 also comprises a communication circuit C representing suitable equipment for receiving and sending signals in the manner described herein. The solution and embodiments herein are not limited to using any specific types of networks, technology or protocols for communication.

The scheduling node 900 comprises means configured or arranged to perform the actions 300-306 of the flow chart in FIG. 3. The scheduling node 900 is arranged to enable simultaneous communication of data for multiple wireless devices on a shared radio resource comprising one or more resource units.

The scheduling node 900 is configured to divide the wireless devices into multiple groups such that the number of wireless devices in each group does not exceed the number of resource units in the shared radio resource. This operation may be performed by a dividing unit 900A in the scheduling node 900, e.g. in the manner described for action 300 above.

The scheduling node 900 is also configured to assign at least one resource unit in the shared radio resource to one or more wireless devices in each group such that the at least one resource unit is shared by wireless devices across different groups. This operation may be performed by an assigning unit 900B in the scheduling node 900, e.g. in the manner described for action 302 above.

The scheduling node 900 is also configured to assign rotation angles to the one or more wireless devices in the different groups, indicating that the wireless devices in each group should use a rotation angle that is different from the rotation angle(s) used by the wireless devices in the other group(s). This operation may be performed by the assigning unit 900B, e.g. in the manner described for action 304 above.

The scheduling node 900 is further configured to signal the assignment of the at least one resource unit and rotation angles and a repetition factor, to enable communication of data for the one or more wireless devices in each group using the rotation angle of said group and so that the data is repeated according to the repetition factor. This operation may be performed by a signalling unit 900C in the scheduling node 900, e.g. in the manner described for action 306 above.

The transmitting node 902 may be configured to operate according to any of the above-described examples and embodiments described for FIG. 4. The transmitting node 902 is shown to comprise a processor P and a memory M, the memory M comprising instructions executable by said processor P whereby the transmitting node 902 is operative as described herein. The transmitting node 902 also comprises a communication circuit C representing suitable equipment for receiving and sending signals in the manner described herein.

The transmitting node 902 comprises means configured or arranged to perform the actions 400-408 of the flow chart in FIG. 4. The transmitting node 902 is arranged to transmit data to a receiving node 904 on a shared radio resource comprising one or more resource units.

The transmitting node 902 is configured to obtain from a scheduling node 900, an assignment of at least one resource unit in the shared radio resource to multiple wireless devices and of a rotation angle. The transmitting node 902 is also configured to obtain a repetition factor from the scheduling node 900. The above obtaining operations may be performed by an obtaining unit 902A in the transmitting node 902, e.g. in the manner described for action 400 above.

The transmitting node 902 is also configured to create a time domain signal from the data. This operation may be performed by a processing unit 902B in the transmitting node 902, e.g. in the manner described for action 402 above. The transmitting node 902 is also configured to repeat the time domain signal according to the repetition factor. This operation may be performed by the processing unit 902B, e.g. in the manner described for action 404 above.

The transmitting node 902 is also configured to apply said rotation angle to the repeated time domain signal to obtain a baseband signal. This operation may be performed by the processing unit 902B, e.g. in the manner described for action 406 above. The transmitting node 902 is also configured to transmit the baseband signal as an up-mixed Radio Frequency, RF, signal on a resource unit in the shared radio resource. This operation may be performed by a transmitting unit 902C, e.g. in the manner described for action 408 above.

The receiving node 904 may be configured to operate according to any of the above-described examples and embodiments described for FIG. 5. The receiving node 904 is shown to comprise a processor P and a memory M, the memory M comprising instructions executable by said processor P whereby the receiving node 904 is operative as described herein. The receiving node 904 also comprises a communication circuit C representing suitable equipment for receiving and sending signals in the manner described herein.

The receiving node 904 comprises means configured or arranged to perform the actions 500-508 of the flow chart in FIG. 5. The receiving node 904 is arranged to receive data from a transmitting node 902 on a shared radio resource comprising one or more resource units.

The receiving node 904 is configured to obtain, from a scheduling node 900, an assignment of at least one resource unit in the shared radio resource to wireless devices in multiple groups and of rotation angles indicating that the wireless devices in each group should use a rotation angle that is different from the rotation angle(s) used by the wireless devices in the other group(s). The receiving node 904 is configured to obtain a repetition factor from the scheduling node 900. The above obtaining operations may be performed by an obtaining unit 904A in the receiving node 904, e.g. in the manner described for action 500 above.

The receiving node 904 is also configured to receive a signal on a resource unit in the shared radio resource. This operation may be performed by a receiving unit 904B in the receiving node 904, e.g. in the manner described for action 502 above.

The receiving node 904 is further configured to divide the signal into multiple blocks, each block corresponding to a baseband signal comprising data repeated consecutively according to the repetition factor. This operation may be performed by a processing unit 904C in the receiving node 904, e.g. in the manner described for action 504 above.

The receiving node 904 is also configured to apply a de-rotation angle to each block such that the de-rotation angle corresponds to one of said rotation angles, and to detect desired data based on the de-rotated blocks. These operations may be performed by the processing unit 904C as well, e.g. in the manner described for actions 506 and 508, respectively.

It should be noted that FIG. 9 illustrates various functional modules in the scheduling node 900, the transmitting node 902 and the receiving node 904, respectively, and the skilled person is able to implement these functional modules in practice using suitable software and hardware. Thus, the solution is generally not limited to the shown structures of the scheduling node 900, the transmitting node 902 and the receiving node 904, and the functional modules 900A-C, 902A-C and 904A-C therein may be configured to operate according to any of the features and embodiments described in this disclosure, where appropriate.

The functional modules 900A-C, 902A-C and 904A-C described above may be implemented in the scheduling node 900, the transmitting node 902 and the receiving node 904, respectively, by means of program modules of a respective computer program comprising code means which, when run by the processor P causes the scheduling node 900, the transmitting node 902 and the receiving node 904 to perform the above-described actions and procedures. Each processor P may comprise a single Central Processing Unit (CPU), or could comprise two or more processing units. For example, each processor P may include a general purpose microprocessor, an instruction set processor and/or related chips sets and/or a special purpose microprocessor such as an Application Specific Integrated Circuit (ASIC). Each processor P may also comprise a storage for caching purposes.

Each computer program may be carried by a computer program product in each of the scheduling node 900, the transmitting node 902 and the receiving node 904 in the form of a memory having a computer readable medium and being connected to the processor P. The computer program product or memory M in each of the scheduling node 900, the transmitting node 902 and the receiving node 904 thus comprises a computer readable medium on which the computer program is stored e.g. in the form of computer program modules or the like. For example, the memory M in each node may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the respective scheduling node 900, the transmitting node 902 and the receiving node 904.

The solution described herein may be implemented in each of the scheduling node 900, the transmitting node 902 and the receiving node 904 by a computer program comprising instructions which, when executed on at least one processor, cause the at least one processor to carry out the actions according to any of the above embodiments, where appropriate. The solution may also be implemented at each of the scheduling node 900, the transmitting node 902 and the receiving node 904 in a carrier containing the above computer program, wherein the carrier is one of an electronic signal, optical signal, radio signal, or computer readable storage medium.

The solution described herein may thus be implemented in each of the scheduling node 900, the transmitting node 902 and the receiving node 904 by means of a computer program comprising instructions which, when executed on at least one processor, cause the at least one processor to carry out the actions according to any of the above features and embodiments, where appropriate. A carrier containing the above computer program may also be used when implementing the solution, wherein the carrier is one of an electronic signal, optical signal, radio signal, or computer readable storage medium.

While the solution has been described with reference to specific exemplifying embodiments, the description is generally only intended to illustrate the inventive concept and should not be taken as limiting the scope of the solution. For example, the terms "scheduling node", "transmitting node", "receiving node", "radio resource", "resource unit", "rotation angle", "de-rotation angle" and "repetition factor" have been used throughout this disclosure, although any other corresponding entities, functions, and/or parameters could also be used having the features and characteristics described here. The solution is defined by the appended claims.

The invention claimed is:

1. A method performed by a scheduling node for enabling simultaneous communication of data for multiple wireless devices on a shared radio resource comprising one or more resource units, the method comprising:
   dividing the wireless devices into multiple groups such that the number of wireless devices in each group does not exceed the number of resource units in the shared radio resource,
   assigning at least one resource unit in the shared radio resource to one or more wireless devices in each group such that the at least one resource unit is shared by wireless devices across different groups,
   assigning rotation angles to the one or more wireless devices in the groups indicating that the wireless devices in each group should use a rotation angle that is different from the rotation angle(s) used by the wireless devices in the other group(s), and
   signalling the assignment of the at least one resource unit and rotation angles and a repetition factor, to enable communication of data for the one or more wireless devices in each group using the rotation angle of said group and so that the data is repeated according to the repetition factor.

2. A method according to claim 1, wherein the repetition factor corresponds to the number of groups.

3. A method according to claim 1, wherein the shared radio resource comprises multiple orthogonal resource units which are separated in frequency domain.

4. A method according to claim 1, wherein the repetition factor is selected depending on requirements for at least one of receiver sensitivity and transmission range required to reach at least some of the wireless devices.

5. A method according to claim 1, wherein Orthogonal Frequency Division Multiple Access, OFDMA, is used in the communication of OFDM symbols, and wherein the signalled assignment indicates that each OFDM symbol should be transmitted a number of times as a set of equal OFDM symbols according to the repetition factor and that the set of equal OFDM symbols should be rotated according to the rotation angle of the respective group.

6. A method according to claim 5, wherein the signalled assignment further indicates that only one cyclic prefix should be appended prior to the whole set of equal OFDM symbols.

7. A scheduling node arranged to enable simultaneous communication of data for multiple wireless devices on a shared radio resource comprising one or more resource units, wherein the scheduling node is configured to:
   divide the wireless devices into multiple groups such that the number of wireless devices in each group does not exceed the number of resource units in the shared radio resource,
   assign at least one resource unit in the shared radio resource to one or more wireless devices in each group such that the at least one resource unit is shared by wireless devices across different groups,
   assign rotation angles to the one or more wireless devices in the groups indicating that the wireless devices in each group should use a rotation angle that is different from the rotation angle(s) used by the wireless devices in the other group(s), and
   signal the assignment of the at least one resource unit and rotation angles and a repetition factor, to enable communication of data for the one or more wireless devices in each group using the rotation angle of said group and so that the data is repeated according to the repetition factor.

8. A scheduling node according to claim 7, wherein the repetition factor corresponds to the number of groups.

9. A scheduling node according to claim 7, wherein the shared radio resource comprises multiple orthogonal resource units which are separated in frequency domain.

10. A scheduling node according to claim 7, wherein the scheduling node is configured to select the repetition factor depending on requirements for at least one of receiver sensitivity and transmission range required to reach at least some of the wireless devices.

11. A scheduling node according to claim 7, wherein Orthogonal Frequency Division Multiple Access, OFDMA, is used in the communication of OFDM symbols, and wherein the signalled assignment indicates that each OFDM symbol should be transmitted a number of times as a set of equal OFDM symbols according to the repetition factor and that the set of equal OFDM symbols should be rotated according to the rotation angle of the respective group.

12. A scheduling node according to claim 11, wherein the signalled assignment further indicates that only one cyclic prefix should be appended prior to the whole set of equal OFDM symbols.

13. A method performed by a transmitting node for transmitting data to a receiving node on a shared radio resource comprising one or more resource units, the method comprising:
   obtaining, from a scheduling node, an assignment of at least one resource unit in the shared radio resource to multiple wireless devices, and of a rotation angle and a repetition factor,
   creating a time domain signal from the data,
   repeating the time domain signal according to the repetition factor,
   applying said rotation angle to the repeated time domain signal to obtain a baseband signal, and
   transmitting the baseband signal as an up-mixed Radio Frequency, RF, signal on a resource unit in the shared radio resource.

14. A method according to claim 13, wherein Orthogonal Frequency Division Multiple Access, OFDMA, is used in the communication of OFDM symbols, and wherein each OFDM symbol is transmitted with said data a number of times as a set of equal OFDM symbols according to the repetition factor and the set of equal OFDM symbols is rotated according to the rotation angle.

15. A method according to claim 14, wherein only one cyclic prefix is appended prior to the whole set of equal OFDM symbols.

16. A transmitting node arranged to transmit data to a receiving node on a shared radio resource comprising one or more resource units, wherein the transmitting node is configured to:
   obtain, from a scheduling node, an assignment of at least one resource unit in the shared radio resource to multiple wireless devices and of a rotation angle and a repetition factor,
   create a time domain signal from the data,
   repeat the time domain signal according to the repetition factor,
   apply said rotation angle to the repeated time domain signal to obtain a baseband signal, and transmit the baseband signal as an up-mixed Radio Frequency, RF, signal on a resource unit in the shared radio resource.

17. A transmitting node according to claim 16, wherein Orthogonal Frequency Division Multiple Access, OFDMA, is used in the communication of OFDM symbols, and wherein the transmitting node is configured to transmit each OFDM symbol is with said data a number of times as a set of equal OFDM symbols according to the repetition factor and to rotate the set of equal OFDM symbols according to the rotation angle.

18. A transmitting node according to claim 17, wherein only one cyclic prefix is appended prior to the whole set of equal OFDM symbols.

19. A method performed by a receiving node for receiving data from a transmitting node on a shared radio resource comprising one or more resource units, the method comprising:
   obtaining, from a scheduling node, an assignment of at least one resource unit in the shared radio resource to wireless devices in multiple groups and of rotation angles indicating that the wireless devices in each group should use a rotation angle that is different from the rotation angle(s) used by the wireless devices in the other group(s), and a repetition factor,
   receiving a signal on a resource unit in the shared radio resource,
   dividing the signal into multiple blocks, each block corresponding to a baseband signal comprising data repeated according to the repetition factor,
   applying a de-rotation angle to each block such that the de-rotation angle corresponds to one of said rotation angles, and
   detecting desired data based on the de-rotated blocks.

20. A method according to claim 19, wherein each de-rotated block is split into a number of consecutive slices corresponding to the repetition factor, and each block is detected by combining the consecutive slices.

21. A method according to claim 19, wherein the repetition factor corresponds to the number of groups.

22. A method according to claim 19, wherein the receiving node is a network node serving at least one wireless device in each group, and wherein data from said wireless devices is detected by applying de-rotation angles to each block corresponding to respective rotation angles of each group.

23. A method according to claim 22, wherein the received signal comprises multiple baseband signals, each baseband signal being received on the resource unit from a wireless device in a respective group, and wherein a de-rotation angle corresponding to the rotation angle of said group is applied to each block.

24. A receiving node arranged to receive data from a transmitting node on a shared radio resource comprising one or more resource units, wherein the receiving node is configured to:
   obtain, from a scheduling node, an assignment of at least one resource unit in the shared radio resource to wireless devices in multiple groups and of rotation angles indicating that the wireless devices in each group should use a rotation angle that is different from the rotation angle(s) used by the wireless devices in the other group(s), and a repetition factor,
   receive a signal on a resource unit in the shared radio resource,
   divide the signal into multiple blocks, each block corresponding to a baseband signal comprising data repeated according to the repetition factor,
   apply a de-rotation angle to each block such that the de-rotation angle corresponds to one of said rotation angles, and
   detect desired data based on the de-rotated blocks.

25. A receiving node according to claim 24, wherein the receiving node is configured to split each de-rotated block into a number of consecutive slices corresponding to the repetition factor, and to detect each block by combining the consecutive slices.

26. A receiving node according to claim 24, wherein the repetition factor corresponds to the number of groups.

27. A receiving node according to claim 24, wherein the receiving node is a network node serving at least one wireless device in each group, and wherein data from said wireless devices is detected by applying de-rotation angles to each block corresponding to respective rotation angles of each group.

28. A receiving node according to claim 27, wherein the received signal comprises multiple baseband signals, each baseband signal being received on the resource unit from a wireless device in a respective group, and wherein a de-rotation angle corresponding to the rotation angle of said group is applied to each block.

* * * * *